UNITED STATES PATENT OFFICE.

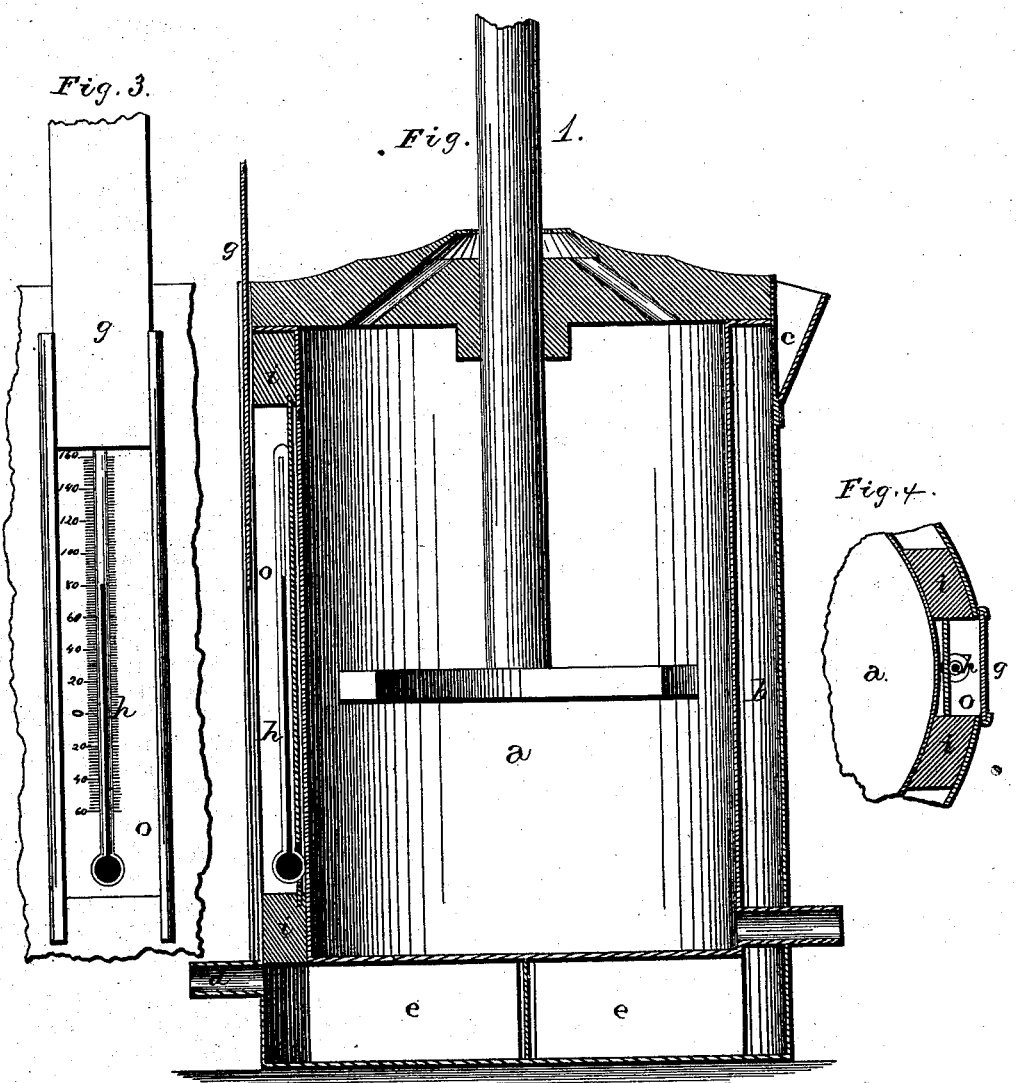

JAMES C. BAKER, OF CORRY, PENNSYLVANIA.

IMPROVEMENT IN CHURNS.

Specification forming part of Letters Patent No. 168,123, dated September 28, 1875; application filed August 11, 1875.

*To all whom it may concern:*

Be it known that I, JAS. C. BAKER, of Corry, in the county of Erie and State of Pennsylvania, have invented certain new and useful Improvements in Churns; and I do hereby declare the following to be a full, clear, and exact description of the invention, such as will enable others skilled in the art to which it pertains to make and use it, reference being had to the accompanying drawings, which form part of this specification.

My invention relates to an improvement in churns; and it consists in the arrangement and construction of parts that will be more fully described hereafter.

The accompanying drawings represent my invention.

$a$ represents the churn, in which the milk is placed, and which is surrounded by a water jacket or space, $b$, in the usual manner. The water is poured into this space through the openings at $c$, and is drawn off at $d$ when no longer desired. The bottom of the churn being raised up above the bottom of a water-jacket, as shown, so that the water can act on the bottom as well as the sides of the churn, there are a number of radial supports, $e$, placed under the bottom of the churn, so as to support the weight of milk in the churn. These supports do not quite meet in the center, so as to leave a space through which the water can readily flow in being drawn off. In one side there is made an elongated opening, $o$, in the water-jacket, which is opened and closed by a slide or cover, $g$, so as to exclude the air from the thermometer $h$, which is placed therein. The top, bottom, and sides of this opening $o$ are closed by strips of wood $i$, that are sufficiently thick to not only prevent the water, but the heat from the water, from penetrating the chamber, and thus affecting the thermometer. As the bulb of the thermometer touches the side of the churn $a$, as soon as the hot water in the jacket raises the milk to the required temperature for churning, the thermometer indicates it. The thermometer being thus inclosed in a chamber, $o$, and separated from the warm water by a non-conductor, it is affected solely by the temperature of the milk in the churn.

Having thus described my invention, I claim—

1. The chamber $o$, made wholly within the water-chamber $b$, and provided with the slide $g$, in combination with the thermometer $h$ and dividing-strips of wood $i$, whereby the thermometer is protected both from the heat of the water in the chamber $b$ and the outside air, substantially as shown and described.

2. The braces or supports $e$, placed radially under the bottom of the churn, and having spaces between them for the water to flow freely between, as set forth.

In testimony that I claim the foregoing I have hereunto set my hand this 28th day of July, 1875.

JAS. C. BAKER.

Witnesses:
THOS. W. TYLER,
S. B. BROOKS.